(12) United States Patent
Jiang et al.

(10) Patent No.: US 8,148,020 B2
(45) Date of Patent: Apr. 3, 2012

(54) MOLYBDENUM/AIR BATTERY AND CELL DESIGN

(75) Inventors: Rongzhong Jiang, Olney, MD (US); Charles W. Walker, Jr., Olney, MD (US); Judy Walker, legal representative, Olney, MD (US); Deryn Chu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 486 days.

(21) Appl. No.: 12/416,309

(22) Filed: Apr. 1, 2009

(65) Prior Publication Data
US 2010/0255375 A1 Oct. 7, 2010

(51) Int. Cl.
*H01M 8/02* (2006.01)

(52) U.S. Cl. ...... 429/405; 429/403; 429/404; 429/231.5

(58) Field of Classification Search .................. None
See application file for complete search history.

(56) References Cited

U.S. PATENT DOCUMENTS

| | | |
|---|---|---|
| 4,322,483 A | 3/1982 | Tune |
| 4,808,498 A | 2/1989 | Tarcy et al. |
| 4,842,963 A | 6/1989 | Ross, Jr. |
| 4,925,744 A | 5/1990 | Niksa et al. |
| 5,049,457 A | 9/1991 | Niksa et al. |
| 5,228,958 A | 7/1993 | Goldstein et al. |
| 5,232,798 A | 8/1993 | Goldstein et al. |
| 5,279,905 A | 1/1994 | Mansfield, Jr. et al. |
| 5,378,329 A | 1/1995 | Goldstein et al. |
| 5,445,901 A | 8/1995 | Korall et al. |
| 5,487,955 A | 1/1996 | Korall et al. |
| 5,569,555 A | 10/1996 | Goldstein et al. |
| 5,578,183 A | 11/1996 | Cooper |
| 5,599,637 A | 2/1997 | Pecherer et al. |
| 5,724,431 A | 3/1998 | Reiter et al. |
| 5,780,186 A | 7/1998 | Casey, Jr. |
| 5,792,328 A | 8/1998 | Givon |
| 6,091,230 A | 7/2000 | Winzer |
| 6,166,548 A | 12/2000 | Winzer et al. |
| 6,265,109 B1 | 7/2001 | Yamamoto et al. |
| 2002/0015871 A1* | 2/2002 | Tao et al. .................. 429/27 |
| 2002/0142203 A1* | 10/2002 | Ma et al. .................. 429/27 |
| 2004/0143457 A1 | 7/2004 | Demirian et al. |
| 2005/0208386 A1* | 9/2005 | Clarke .................. 429/347 |

* cited by examiner

*Primary Examiner* — Patrick Ryan
*Assistant Examiner* — Wyatt McConnell
(74) *Attorney, Agent, or Firm* — Avrom David Spevack

(57) ABSTRACT

A metal-air battery has an anode in which the electrochemically active material is molybdenum. The molybdenum may be in the form of a bulk body of material or it may comprise a particulate material dispersed with or in another material. In some instances, the molybdenum may comprise a member of an alloy or mixture. Also disclosed is a modular battery system which may include the molybdenum-based anode material.

19 Claims, 5 Drawing Sheets

MOLYBDENUM/AIR BATTERY AND CELL DESIGN

GOVERNMENT INTEREST

The invention described herein may be manufactured, used, and licensed by or for the United States Government.

FIELD OF THE INVENTION

This invention relates generally to electrochemical cells. More specifically, the invention relates to metal-air batteries, and in particular relates to a metal-air battery utilizing molybdenum as an anode material. The invention further relates to particular designs of modular electrochemical cells.

BACKGROUND OF THE INVENTION

Metal-air batteries are electrochemical cells wherein the oxidation of a metal anode by an oxidizing agent, such as air, creates a flow of electrical current. As such, metal-air batteries may also be considered to be a type of a fuel cell wherein the metal of the anode is considered to be the fuel.

A generalized metal-air battery includes an anode which is comprised of, or contains, an electrochemically active metal which is oxidized in the operation of the battery to generate electrical current. The metal-air battery further includes a cathode, and in the operation of the battery, oxygen is reduced at the cathode. Typically, the cathode is fabricated from an electrically conductive, air-permeable material such as a carbon fabric, porous metal or the like. The cathode may include a catalytic material therein to facilitate the reduction of oxygen, and such catalytic materials may include noble metals such as platinum and its compounds and alloys. The metal-air battery will also include an electrolyte which is ionically conductive and which is in contact with the anode and cathode. As is typical in batteries, a porous body of separator material may be disposed between the anode and cathode. As will be described in detail hereinbelow, such separators may comprise porous polymeric membranes as well as porous, fibrous materials such as glass, ceramic or cellulosic materials.

Metal-air cells typically have a high energy density as compared to other types of electrochemical cells. Heretofore, metal-air batteries have been fabricated utilizing relatively light metals such as magnesium, aluminum and zinc as electrochemically active anode materials. However, batteries utilizing magnesium or aluminum-based anodes have been found to exhibit problems of stability due to chemical reactions between the metals and electrode components and electrolytes. Zinc-air batteries have been found to be relatively stable when used in conjunction with alkaline electrolytes, and such batteries are in commercial use. Zinc-air batteries have a high theoretical voltage; however, their ultimate energy density is limited by the fact that the zinc comprising the anode undergoes only two-electron oxidation. The theoretical energy density of zinc-air batteries utilizing an alkaline electrolyte is only 489 Wh/Kg based upon the reaction of Zn+2 KOH. Other limitations upon the utility of zinc-air batteries involve the evolution of hydrogen at the anode causing fuel waste and increasing cell resistance. Additives such as mercury and lead may be utilized to retard hydrogen evolution; however, the poisonous nature of these additives does restrict their use. It has also been found that during storage, the electrolytes of zinc-air batteries tend to dry thereby decreasing battery performance. Storage can also cause carbonate formation in the zinc-air battery which can damage separator membranes and compromise cell performance.

As will be appreciated from this discussion, metal-air batteries have many potential advantages over conventional electrical power sources; however, battery structures and materials available to date have not fully exploited the advantages of metal-air battery systems. As will be explained in detail hereinbelow, the present invention provides a novel metal-air battery structure and chemistry which significantly improves upon metal-air battery performance characteristics. These and other advantages of the invention will be apparent from the drawings, discussion and description which follow.

BRIEF DESCRIPTION OF THE INVENTION

Disclosed herein is a metal-air battery. The battery has an anode which includes an electrochemically active metal which is oxidized when the battery is operative to generate electrical power. The electrochemically active metal comprises molybdenum. The battery further includes a cathode which is operative to reduce oxygen when the battery is generating electrical power. An electrolyte is disposed in contact with the anode and the cathode, and a separator may be disposed between the anode and the cathode. The electrolyte may comprise a base such as potassium or sodium hydroxide, or it may comprise an acid such as phosphoric acid. The molybdenum may be present in the anode as a unitary piece of solid or porous metal, or it may be present in a particulate form, and such particles may be intermixed with another material such as carbon. Further disclosed is a modular metal-air battery system. The modular system includes a cathode assembly which includes a case which houses the cathode and an associated electrical lead. The cathode assembly may further include electrode supports, current-collecting structures and the like. The cathode assembly may include an opening in the housing to permit passage of ambient air to the cathode. The modular system further includes an anode cartridge which is reversibly connectable to the cathode assembly. The anode cartridge houses the anode portion of the metal-air battery system and further includes a body of electrolyte material, which may be retained by a porous sponge or other such bibulous material. The anode cartridge will include current collectors and electrical leads. The anode cartridge may include a protective cover which closes off the active surface of the cartridge when it is not in use. A separator membrane is disposed in at least one of the cathode assembly or anode cartridge so that when the two are coupled together, the membrane will be disposed between the cathode and the anode. The modular system may be implemented with particular advantage in connection with the molybdenum-air battery of the present invention.

DETAILED DESCRIPTION OF THE INVENTION

Figure 1:
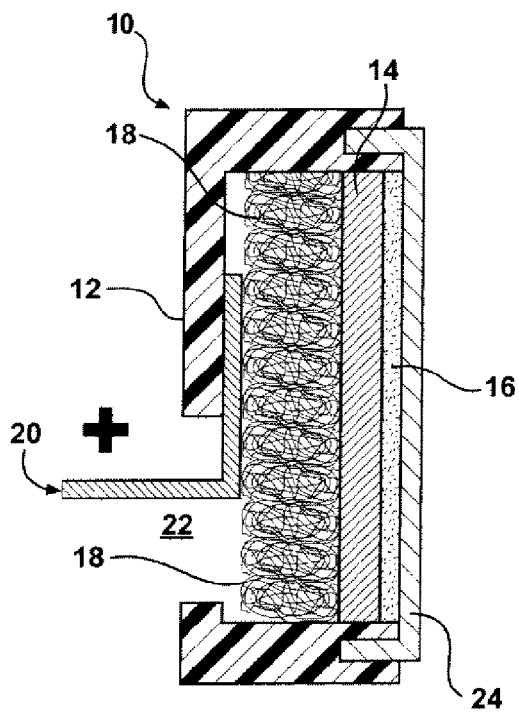
FIG. 1 is a cross-sectional view of a cathode assembly of a modular cell of the present invention.

In accord with the present invention, the anode of a metal-air battery system includes an electrochemically active metal which comprises molybdenum. Within the context of this disclosure, an electrochemically active metal is understood to be a metal which, in a metal-air battery system, is oxidized when the battery is operative to generate power.

Molybdenum is a transition metal with an atomic weight of 95.9 and can provide up to 6 electrons upon oxidation. When molybdenum is used as the anode in a molybdenum-air battery having an acidic electrolyte, the electrode reactions are as follows:

At the anode, $$Mo + 4\,H_2O = H_2MoO_4 + 6\,H^+ + 6e^-\quad E°=0.114\,V \tag{1}$$

At the cathode, $$3/2\,O_2 + 6\,H^+ + 6e^- = 3\,H_2O\quad E°=+1.23\,V \tag{2}$$

The overall reaction in the battery is $$Mo + 3/2\,O_2 + H_2O = H_2MoO_4\ \text{Cell voltage}=1.12\,V \tag{3}$$

When a molybdenum-air battery is operated utilizing an alkaline electrolyte electrode reactions are as follows:

At the anode, $$Mo + 8\,KOH = K_2MoO_4 + 6\,K^+ + 6e^- + 4\,H_2O\quad E°=-0.913\,V \tag{4}$$

At the cathode, $$3/2\,O_2 + 3\,H_2O + 6e^- = 6\,OH^-\quad E°=+0.401\,V \tag{5}$$

Overall reaction is $$Mo + 2\,KOH + 3/2\,O_2 = K_2MoO_4 + H_2O\ \text{Cell voltage}=1.314\,V \tag{6}$$

The theoretical energy density of a battery system of this type is 1581 Wh/Kg when utilizing an acidic electrolyte (calculated based upon the reactants of $Mo+H_2O$) and 1012 Wh/Kg when utilizing a KOH electrolyte (calculated based upon the reactants of $Mo+2\,KOH$). High power is achieved in such battery systems since the electrolytes are aqueous-based solutions having high ionic conductivities, as compared to organic electrolytes in other battery systems. Following the 6-electron oxidation of molybdenum in the presence of water, the final product at the anode is molybdic acid in an acidic electrolyte system, or a salt such as potassium molybdate in an alkaline electrolyte system. Thus, the battery system retains good ionic conductivity throughout its operational life thereby maintaining low cell resistance. Furthermore, spent electrolyte material may be readily recycled by a simple neutralization treatment. The high energy density of the molybdenum-air battery is particularly advantageous for high energy, portable power sources.

Various configurations of cells may be implemented in accord with the present invention. In general, a molybdenum-air cell of the present invention will include a cathode which is at least partially permeable to air or other such oxidizing gases. In one instance, the cathode is comprised of a porous, electrically conductive material such as a carbon cloth of the type which is known in the art. In other instances, porous metal bodies such as metal foams, meshes and the like may also be utilized to form the cathode. Typically, the cathode will include a catalytic material which facilitates oxygen reduction and such catalysts may include platinum group metals used either singly or in combination, although other catalytic materials may likewise be incorporated. In one specific instance, a cathode usable in the present invention comprises a thin layer of carbon cloth having a Pt/carbon catalyst coated thereonto at a density of approximately 0.2 mg/cm². Depending upon cell configuration, the cathode will further include a current collector associated with the carbon cloth, and such a collector may comprise a body of foamed metal. The cathode may also include support structures, housings, casings and the like. The typical cell will include a molybdenum-containing anode structure. The anode typically does not need any catalyst because the electrochemical reaction of molybdenum can be carried out at the surfaces of the metal itself. In the molybdenum anode there are three-dimensional electrochemical reactions of molybdenum and the thickness of the anode layer can be as large as desired. This is in distinction to conventional cells where anode reactions are confined to a relatively thin surface. As will be described in detail hereinbelow, the molybdenum may be in the form of a fine metal powder interspersed with a conductive material such as carbon, or it may comprised a foamed body of metal, a roughened metal plate, or a smooth metal plate. Use of high surface area anodes allows for the fabrication of batteries which can deliver high levels of power.

As discussed above, the cell will include an electrolyte which may be alkaline or acidic. The electrolyte may be gelled or otherwise thickened. The cell may also include a separator membrane disposed between the anode and cathode. The membrane is porous, and in specific instances is microporous. The membrane allows for the passage of electrolyte and ions therethrough, while preventing direct contact between the anode and cathode. As will be described in detail hereinbelow, the membrane may comprise a porous polymeric body such as a polysulfone material or a perfluorosulfonate such as the poly-perfluorosulfonic acid material sold commercially under the designation Nafion® by DuPont. In other instances, the membrane may be comprised of a body of fibrous material such as a body of glass fibers, ceramic fibers, or cellulose fibers. The porosity of the membrane is selected so that in the instance where the molybdenum of the anode is present in the form of particles, those particles will not pass therethrough.

As will be appreciated by those of skill in the art, the battery of the present invention may be implemented in a variety of configurations. The invention will be described with reference to one specific and unique configuration which comprises a modular battery system where the anode and cathode components of the battery are separated into modules or cartridges which may be selectably engaged with one another. In this manner, a depleted battery may be "recharged" by simply replacing a spent anode cartridge with a fresh anode cartridge.

Referring now to FIG. 1, there is shown a cross-sectional view of a cathode assembly 10 in accord with this embodiment of the invention. The cathode assembly includes a case 12 which is typically comprised of an electrically insulating material such as a polymer. Disposed within the case 12 is a body of porous, electrically conductive carbon cloth 14. In this embodiment, the carbon cloth is approximately 0.3 mm thick, and it is treated with a fluoropolymer material so as to render it hydrophobic. In this manner, air can readily pass through the carbon cloth but aqueous electrolytes cannot. A body of catalytic material 16 is supported on a first face of the carbon cloth 14. This catalytic material 16 comprises carbon having a platinum black catalyst disposed thereupon. The thickness of this layer is, in this embodiment, approximately 0.005 mm, and the catalyst loading on the carbon cloth 14 is approximately 0.2 mg/cm$^2$. The carbon cloth 14 and associated catalyst 16 form the electrochemically active portion of the cathode assembly 10.

Also disposed within the case 12 is a body of metal foam 18 which serves to provide an electrically conductive, gas permeable support for the carbon cloth 14. In this particular embodiment, the thickness of the metal foam is approximately 2.0 mm. This foam may, in some instances, be comprised of titanium or nickel, although other metals may likewise be employed as may be carbon foams and the like.

A cathode lead 20 is affixed to the metal foam 18 and serves to provide electrical communication with the cathode. As will be seen, the case 12 has a window portion 22 formed therein so as to permit air to pass through the case 12, through the metal foam 18 and through the carbon cloth 14. This window 22 may include a closure member (not shown), which closes off the window opening 22 when the battery is not in use.

A microporous separator membrane 24 covers the carbon cloth 14 and associated catalyst layer 16. The separator membrane is sufficiently porous to allow electrolyte to pass therethrough, but prevents the anode from contacting the cathode; and, in particular, prevents molybdenum metal particles from migrating from the anode to the athode. As discussed above, there are a variety of materials which may be utilized to fabricate the separator membrane. In one specific instance, the membrane material comprises a polysulfone polymer having a thickness of approximately 0.15 mm.

Figure 2:
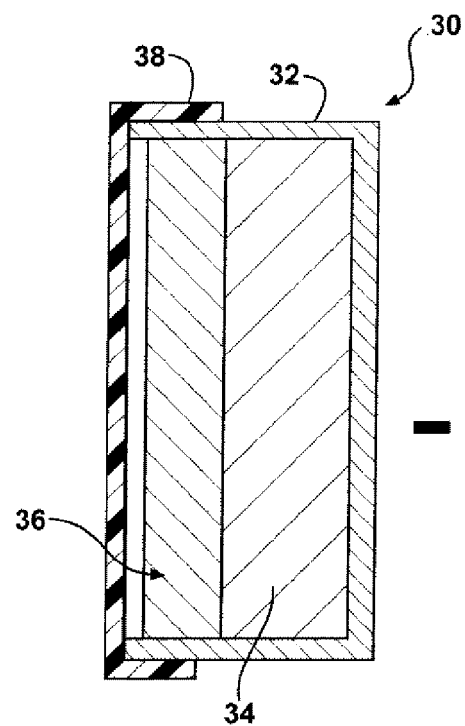
FIG. 2 is a cross-sectional view of an anode cartridge which may be used in a modular battery system of the present invention.

Referring now to FIG. 2, there is shown an anode cartridge 30 which may be utilized in combination with the cathode assembly 10 of FIG. 1 to complete a molybdenum-air battery. The anode cartridge 30 includes an anode case 32 which is typically fabricated from an electrically conductive material so that it may form one electrical lead of the battery. The case 32 may be comprised of any metal which is nonreactive with the other components of the system. In this regard, the case may be comprised of titanium, copper, molybdenum, steel, or the like. In some instances, the case may be fabricated from an electrically insulating material, in which instance a separate current-collecting structure will be disposed therewithin.

A body of anode material 34 is disposed within the case. It is this body of anode material 34 which includes the electrochemically active molybdenum. In some instances, the entirety of the anode material 34 may be fabricated from molybdenum, and this molybdenum may be in the form of a solid body of metal or in the form of a porous body of metal such as a foam, mesh, sintered powder or the like. In other instances, the anode material 34 may comprise a mixture of molybdenum, such as molybdenum powder, in combination with an electrically conductive material such as carbon. In yet other instances, the anode material may comprise a mixture of molybdenum and another metal either in the form of particles, pressed particles, sintered particles, or an alloy. The other materials used in combination with the molybdenum may themselves be electrochemically active, or they may be inert to the electrochemical reactions of the battery system. All of such embodiments are within the scope of this invention.

The anode cartridge 30 further includes an electrolyte, and in this embodiment the electrolyte is absorbed into a porous body such as a body of sponge material 36. In this embodiment, the sponge 36 is a synthetic polymeric sponge having a thickness of 5 mm. As noted above, the electrolyte may, optionally, be gelled or thickened. In some instances, the electrolyte may have sufficient viscosity so that the sponge material may be dispensed with. In the depicted embodiment, a front cap 38 is disposed in engagement with the anode case 32 so as to seal the anode cartridge 30 against the ambient environment. This cap 38 is used only for storage, and is removed prior to use of the cartridge. The cap may be fabricated from a variety of durable materials compatible with the electrolyte and remaining components of the system. Such materials will include polymers, metals, coated papers and the like.

Figure 3:
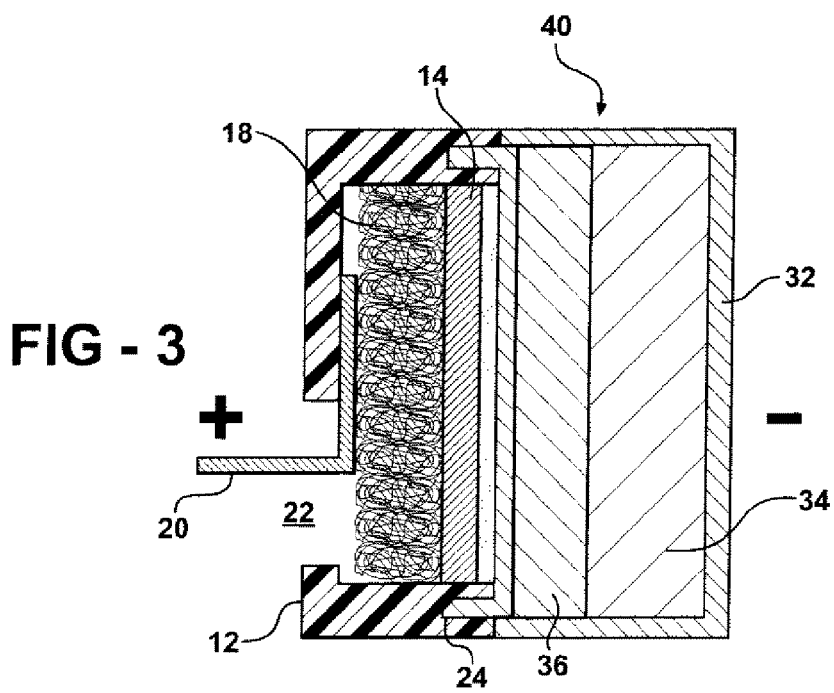
FIG. 3 is a cross-sectional view of a modular metal-air battery of the present invention as comprised of the cathode assembly of FIG. 1 and the anode cartridge of FIG. 2.

Referring now to FIG. 3, there is shown a cross-sectional view of a molybdenum-air battery 40 assembled from the cathode assembly 10 of FIG. 1 and the anode cartridge 30 of FIG. 2. In assembling the battery 40, the front cap 38 of the anode cartridge 30 is removed and the cartridge placed in contact with the porous separator membrane 24 of the cathode assembly 10. The electrolyte material retained in the sponge 36 permeates the membrane 24 and passes through to the catalyst surface 16. The fact that the carbon cloth is treated with a hydrophobic material prevents the electrolyte from passing through the carbon cloth 14 to the metal foam 18.

In the operation of the battery 40, air passes through the window opening 22 in the cathode case 12 to the carbon cloth cathode 14. At the cathode oxygen is reduced to form water, and in the process consumes electrons. At the anode, molybdenum is oxidized and in the process generates electrons which flow to the cathode through an external circuit in communication with the anode case 32 and the cathode lead 20. In the operation of the battery, the molybdenum is consumed and converted to either molybdic acid or a molybdic acid salt, depending upon the particular electrolyte utilized. When all of the molybdenum is consumed, the cell ceases to operate. The fact that the particular battery of FIG. 3 is modular allows for the cell to be regenerated by replacing the spent anode cartridge with a fresh cartridge.

The present invention will now be described in detail by way of examples which serve to illustrate the construction and testing of illustrative embodiments. However, it will be understood that the present invention is in no way limited to the examples set forth below.

While the molybdenum-air battery of the present invention was described with reference to the modular cell structure of FIGS. 1-3, it is to be understood that the battery may be implemented in a number of modular and non-modular configurations. Also, the modular cell of the present invention may be implemented in configurations other than those shown herein, and these configurations are not restricted to the use of molybdenum-air batteries; but, may be used with other metal-air battery chemistries.

General Procedure

Molybdenum metal powder (having an average particle size: of about 3-7 microns, purchased from Johnson Matthey Company) was used as an anode fuel. It is believed that smaller particle sizes have improved electrochemical activity. Polyestersulfone filter paper (purchased from the Thomas Scientific Company) was used as a microporous separator. Other materials including thin glass fiber (gift sample from Saint-Gobain Vetrotex) and Nafion 112 membrane (purchased from Dupont Chemical Company) were also used as separators in different experiments. 30% KOH was used as a base electrolyte, and 40% $H_3PO_4$ was used as an acid electrolyte. The gas diffusion electrode was carbon cloth (purchased from E-Tek Inc.), which was backed by Nickel foam (2 mm thick Nickel Foam, purchased from Marketech International Company). The carbon cloth was further coated with Pt black for catalytic oxygen reduction. Both the anode and cathode current collectors were titanium foil (0.025 mm thick, purchased from Johnson Matthey Company). The titanium metal is stable in acid, base, and also stable in both oxidative and reducing electrochemical reactions. One percent polyethylene oxide (1,000,000 molecular weight, Aldrich Chemical Company) was used for anode gelling material in acidic electrolyte. No anode gelling material was used in the basic electrolyte.

A battery test station (from Arbin Instruments) was used for electrochemical discharge of the Mo-air cell.

EXAMPLE 1

Figure 4:
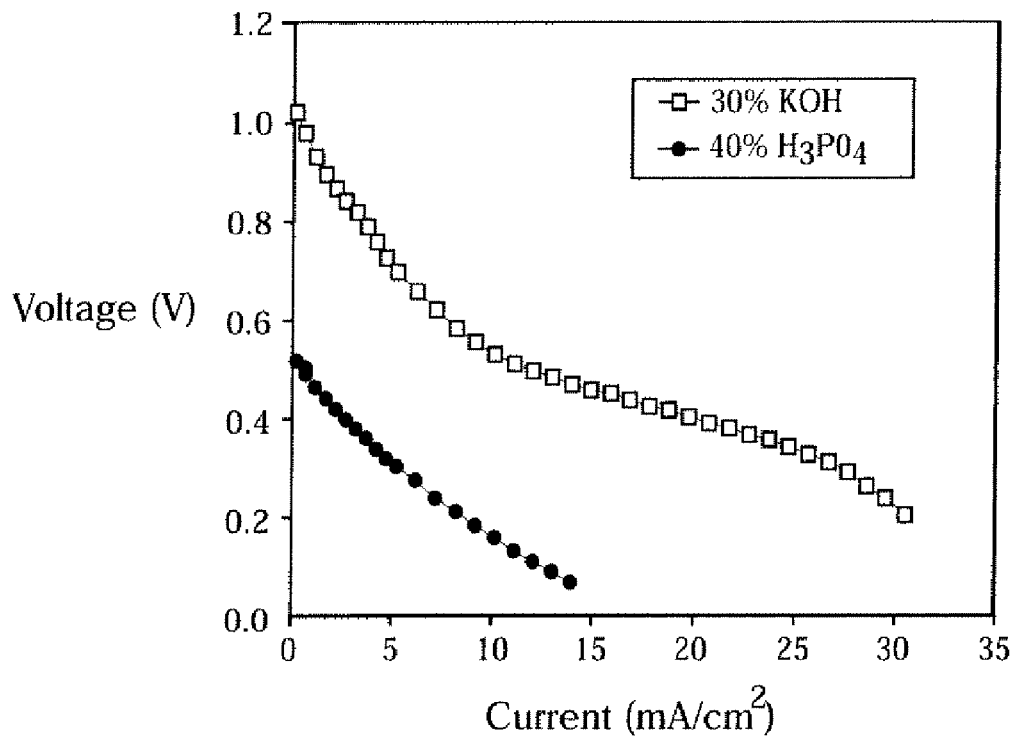
FIG. 4 is a graph showing discharge voltage-current curves of molybdenum-air batteries of the present invention utilizing alkaline and acidic electrolytes.
Figure 5:
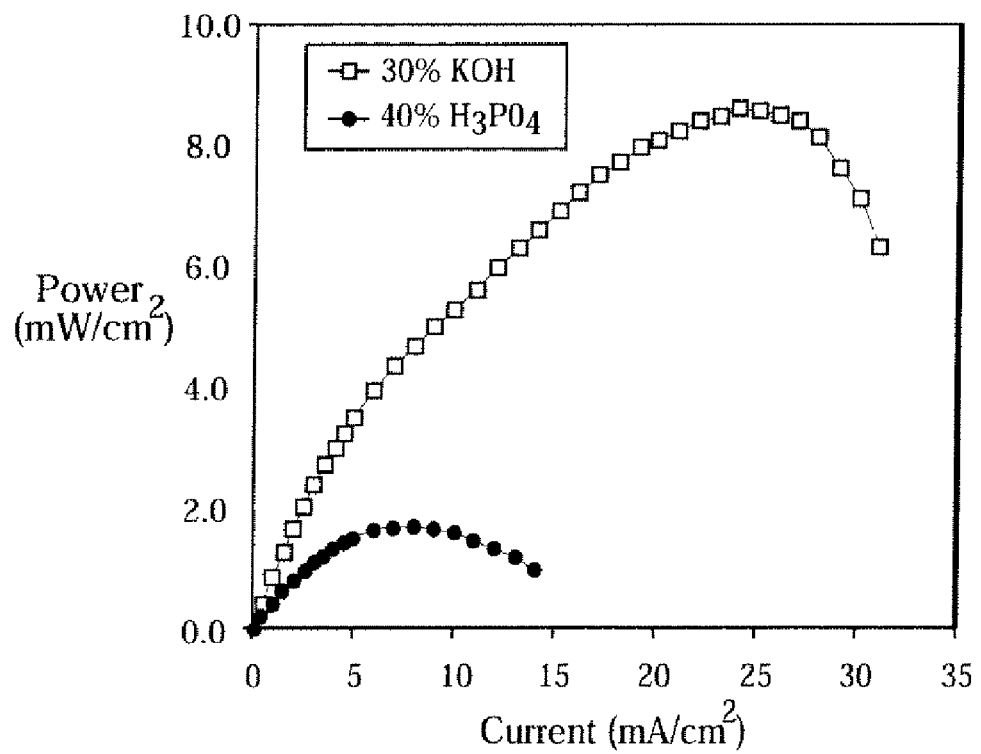
FIG. 5 is a discharge power-current curve of the molybdenum-air batteries of FIG. 4.

The Mo-air battery's performance will depend on the type of electrolyte utilized. FIG. 4 shows the voltage-current curve of a Mo-air battery using alkaline and acidic electrolytes. In the alkaline electrolyte the open circuit voltage is 1.0 V, only about 0.3 V lower than the theoretical cell voltage of 1.31 V. In acidic electrolyte the open circuit voltage is 0.55 V, about only half of the theoretical cell voltage of 1.12 V. The high over potential of the Mo-air battery in acidic electrolyte is brought about by the accumulation of metal oxide layers on the Mo metal particle surface. The alkaline electrolyte is good for dissolving the surface layer of metal oxides, so the over potential of the battery decreases significantly. As shown in FIG. 4, at a given voltage the discharge current for the cell using alkaline electrolyte is remarkably higher than that for the cell using acidic electrolyte. FIG. 5 shows discharge power-current curves of the Mo-air cell using alkaline and acidic electrolytes respectively. The discharge peak power for the cell using alkaline electrolyte is 8.5 mW/cm², but it is only 1.7 mW/cm² when using acidic electrolyte.

EXAMPLE 2

Figure 6:
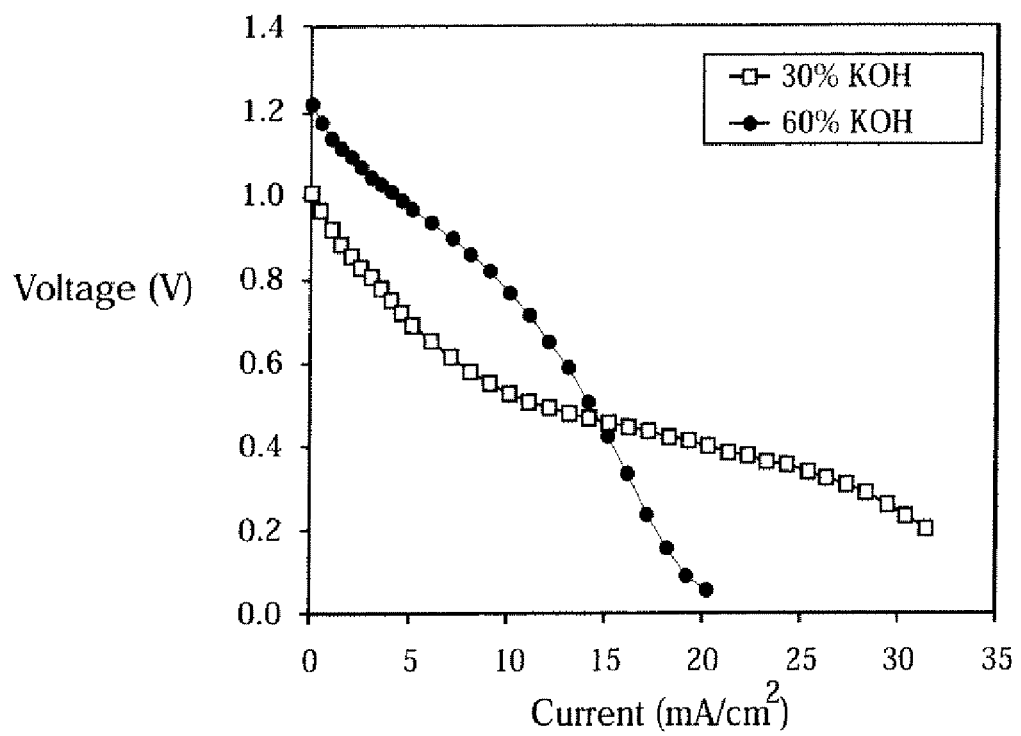
FIG. 6 is a discharge voltage-current curve of molybdenum-air batteries utilizing 30 and 60 percent KOH electrolytes.
Figure 7:
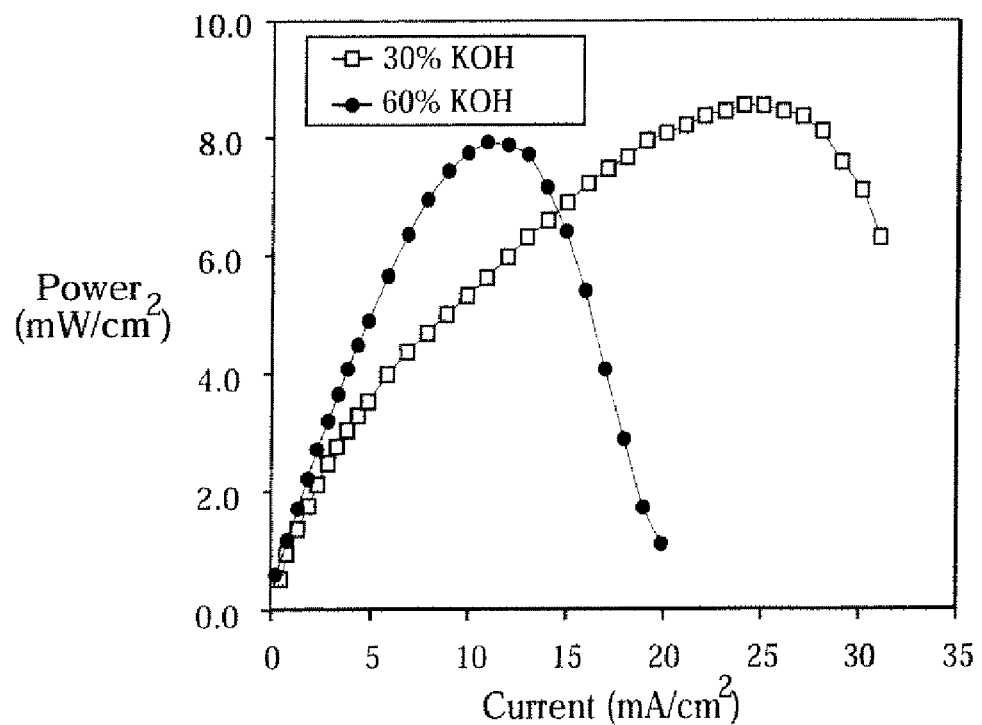
FIG. 7 is a graph showing discharge power-current curves of the molybdenum-air batteries of FIG. 6.

The open circuit voltage of the Mo-air battery shifts up with increasing concentration of the alkaline electrolyte. FIG. 6 shows the effect of KOH concentration on the discharge performance of the Mo-air battery. When KOH concentration is increased from 30% to 60% the open circuit voltage increases from 1.0 V to 1.2 V. However, a high concentration of KOH is detrimental to cell operation at high current discharge. At 0.2 V the discharge current reaches 30 mA/cm² when 30% KOH is used as electrolyte, but only 17 mA/cm² when 60% KOH is used as electrolyte. FIG. 7 shows the power-current curves of the Mo-air cell using 30% and 60% KOH as electrolyte respectively. The discharge peak power is roughly equal (8 mW/cm²) even if using different concentrations of KOH. However, the peak power is obtained at different discharge currents. The location of peak power is at a current of 25 mA/cm² when using 30% KOH as the electrolyte and at current of 11 mA/cm² when using 60% KOH as the electrolyte.

EXAMPLE 3

Figure 8:
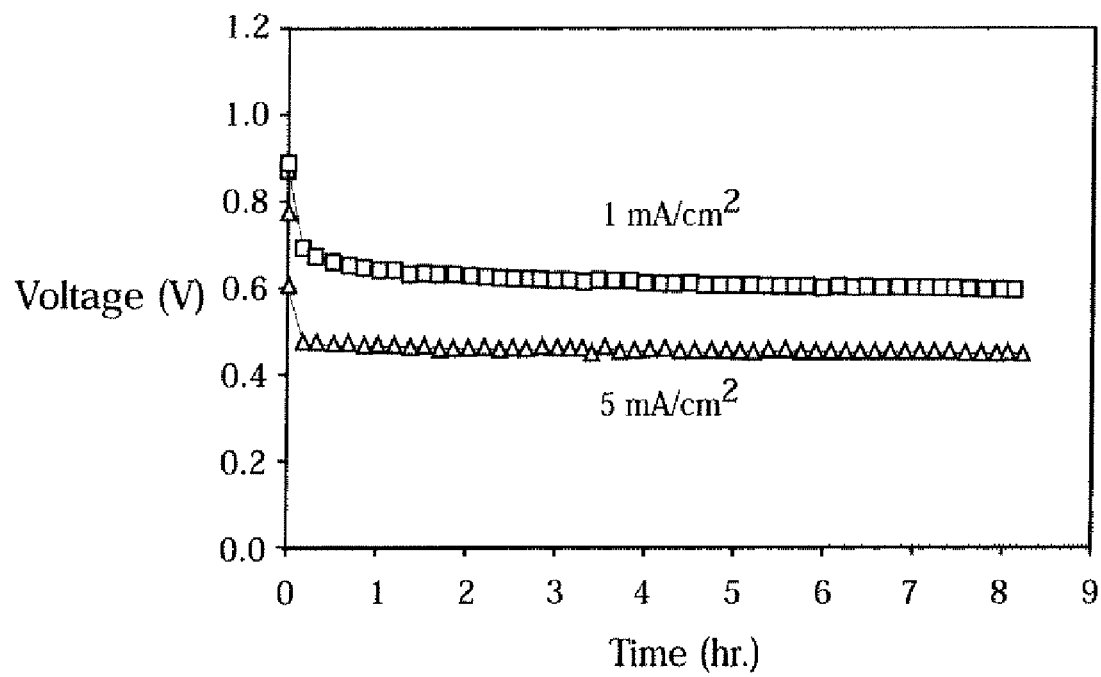
FIG. 8 is a graph showing the constant current discharge performance of a molybdenum-air battery of the present invention at two different discharge rates.

Constant current discharge is used to examine the long-term performance of the Mo-air battery. FIG. 8 shows the discharge performance at a constant current of 1 mA/cm² and 5 mA/cm² while using 30% KOH as electrolyte. The voltage-time curves are relatively flat for 8 hours discharge. There is a small decrease in voltage over time, and this is believed to be the result of an accumulation of metal oxide on the metal particle surface, which operates to block the electrical conductivity and increase the cell's resistance. Based on the long-term discharge experiments like those of FIG. 8, the energy density, power density and the electrochemical parameters were calculated for the Mo-air cell. Table 1 summarizes the electrochemical performance of the Mo-air battery.

TABLE 1

Electrochemical parameters of the Mo-air cell
Mo-air battery

| | |
|---|---|
| Capacity based on Mo + 2 KOH (Ah/Kg) | 773 |
| Theoretical voltage (V) | 1.31 |
| Experimental open circuit voltage (V)* | 1.0* |
| Theoretical energy based on Mo + 2 KOH (Wh/Kg) | 1012 |
| Energy at 0.6 V discharge based on Mo + 2 KOH (Wh/Kg) | 464 |
| Discharge power at 0.6 V based on Mo + 2 KOH (mW/cm²) | 0.6 |
| Discharge peak power based on Mo + 2 KOH (mW/cm²) | 8 |

*Based on 30% KOH as the electrolyte, the open circuit voltage will change by varying the electrolyte concentration.

EXAMPLE 4

Figure 9:
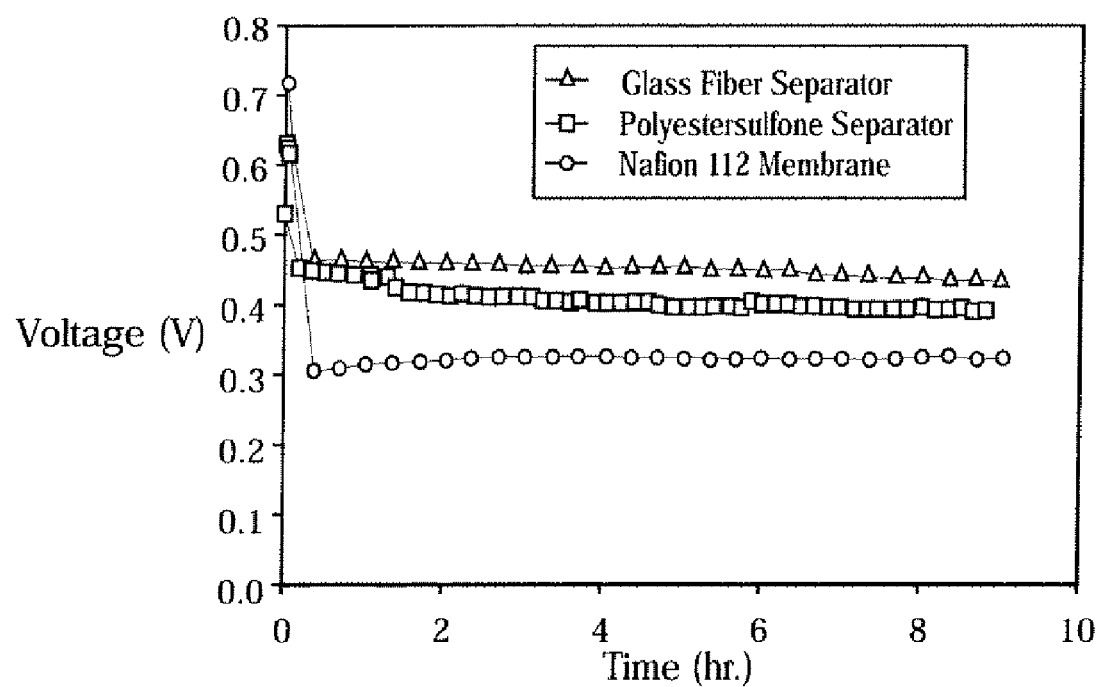
FIG. 9 is a voltage-time curve of a series of molybdenum-air batteries of the present invention utilizing different separator materials.

Three different materials (polyestersulfone, glass fiber, and Nafion 112) were examined for use as separators in the Mo-air battery, and these materials showed significant differences in performance. FIG. 9 shows the voltage-time curves of the Mo-air battery at constant current discharge (1 mA/cm²) while using 40% $H_3PO_4$ as electrolyte. All of these curves are flat during the test. The glass fiber separator shows the best performance in the acidic electrolyte but it is not stable in basic electrolyte. Therefore, we choose microporous polyestersulfone filter as separator for Mo-air battery in basic electrolyte due to its high wetability, micropore size and chemical stability that leads to low cell resistance.

EXAMPLE 5

Figure 10:
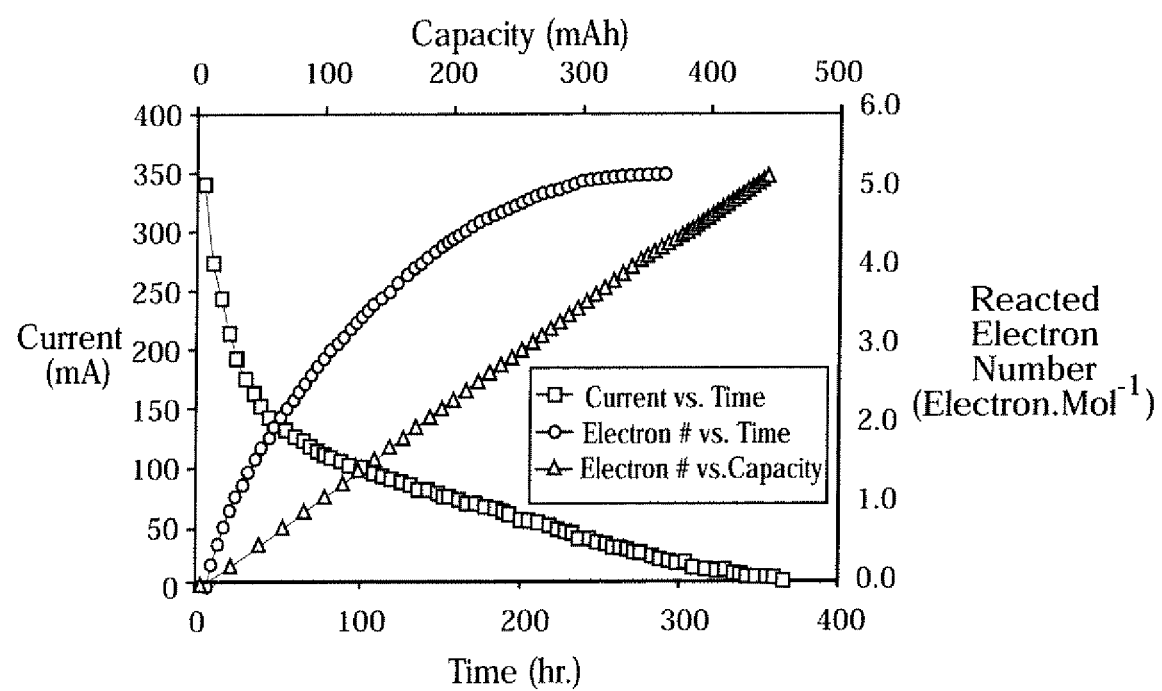
FIG. 10 is a graph showing discharge current-time, electron number-time and electron number-capacity curves of a molybdenum-air battery of the present invention under constant voltage discharge.

The reacted electron number in the Mo-air cell was determined by constant voltage discharge. The reacted electron number can be obtained from the discharge capacity and the amount of the molybdenum metal used in the anode. FIG. 10 shows the current-time, reacted electron number-time, and reacted electron number-capacity curves under constant voltage at 0.1 V while using 0.30 g molybdenum powder as fuel and 40% $H_3PO_4$ as electrolyte. Over time, the discharge current becomes smaller and reaches to zero gradually, but the discharge capacity increases until reaching to a maximum value. The reacted electron number increases with time, and about a 5.2 electron number was obtained at the end of the discharge time. An actual capacity of 1445 mAh/g molybdenum was obtained.

The foregoing is illustrative of some particular embodiments of the present invention. Yet other embodiments will be apparent to those of skill in the art. Therefore, it is to be understood that the foregoing is not meant to be a limitation upon the practice of the invention. It is the following claims, including all equivalents, which define the scope of the invention.

The invention claimed is:

1. A metal-air battery operating at ambient conditions comprising:
   an anode made of molybdenum;
   a cathode which is operative to reduce oxygen when the battery is operative to generate electrical power; and
   an aqueous electrolyte disposed in contact with said anode and said cathode.

2. The battery of claim 1, wherein said electrolyte is an acid.

3. The battery of claim 2, wherein when said battery is operative to generate electrical power, said molybdenum is oxidized to produce molybdic acid.

4. The battery of claim 1, wherein said electrolyte is a base.

5. The battery of claim 4, wherein when said battery is operative to generate electrical power, said molybdenum is oxidized so as to produce a salt of molybdic acid.

6. The battery of claim 1, wherein said electrolyte is gelled or thickened.

7. The battery of claim 1, further including a separator disposed between the anode and the cathode.

8. The battery of claim 7, wherein said separator is a body of a microporous material.

9. The battery of claim 8, wherein said microporous material comprises a polymeric membrane or a body of glass fiber material.

10. The battery of claim 1, wherein said cathode includes a catalytic material active to promote the reduction of oxygen.

11. The battery of claim 10, wherein said catalytic material comprises at least platinum.

12. The battery of claim 1, wherein said cathode is at least partially air permeable.

13. The battery of claim 1, wherein the molybdenum in said anode is in the form of a powder.

14. The battery of claim 13, wherein in said anode, said molybdenum powder is blended with carbon.

15. The battery of claim 1, wherein said cathode is disposed in a cathode housing and said anode is disposed in a cartridge housing which is capable of being reversibly coupled to the cathode housing; whereby the anode portion of said battery is capable of being replaced.

16. A modular metal-air battery system comprising:
   a cathode assembly comprising a housing having a cathode disposed therein, said cathode being operative to reduce oxygen when the battery is operative to generate electrical power;
   an anode cartridge disposed therein having an anode comprising molybdenum, said molybdenum being oxidized when said battery is operative to generate electrical power, said anode cartridge being capable of reversibly engaging said cathode assembly so that in the use of said modular metal-air battery system, said anode cartridge may be replaced; and
   a body of an electrolyte disposed in at least one of said cathode assembly and said anode cartridge.

17. A metal-air battery operating at ambient conditions comprising a molybdenum anode as an electrochemically active metal which is oxidized when the battery is operative to generate electrical power, and a cathode which is operative to reduce oxygen when the battery is operative to generate electrical power.

18. The battery of claim 17, wherein said molybdenum is in the form of a metal powder.

19. The battery of claim 18, wherein said anode further includes carbon mixed with said molybdenum metal powder.

* * * * *